(12) United States Patent
Zhang et al.

(10) Patent No.: US 10,018,779 B2
(45) Date of Patent: Jul. 10, 2018

(54) BENDING-INSENSITIVE SINGLE-MODE FIBER WITH ULTRA LOW ATTENUATION

(71) Applicant: YANGTZE OPTICAL FIBRE AND CABLE JOINT STOCK LIMITED COMPANY, Wuhan, Hubei (CN)

(72) Inventors: Lei Zhang, Hubei (CN); Shengya Long, Hubei (CN); Jihong Zhu, Hubei (CN); Jun Wu, Hubei (CN); Hongyan Zhou, Hubei (CN); Rui Zhang, Hubei (CN); Ruichun Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 15/786,048

(22) Filed: Oct. 17, 2017

(65) Prior Publication Data
US 2018/0039019 A1    Feb. 8, 2018

Related U.S. Application Data

(63) Continuation of application No. PCT/CN2015/096115, filed on Dec. 1, 2015.

(30) Foreign Application Priority Data

Apr. 28, 2015 (CN) .......................... 2015 1 0206222

(51) Int. Cl.
     *G02B 6/44*          (2006.01)
     *G02B 6/036*        (2006.01)
     (Continued)

(52) U.S. Cl.
     CPC ......... *G02B 6/03633* (2013.01); *G02B 6/028* (2013.01); *G02B 6/02009* (2013.01)

(58) Field of Classification Search
CPC . G02B 6/03633; G02B 6/028; G02B 6/02009
See application file for complete search history.

(56) References Cited

U.S. PATENT DOCUMENTS

| | | | | |
|---|---|---|---|---|
| 2011/0058780 | A1* | 3/2011 | Han | C03B 37/018 385/124 |
| 2016/0147012 | A1* | 5/2016 | Wang | G02B 6/0288 385/124 |
| 2017/0031089 | A1* | 2/2017 | de Montmorillon | G02B 6/0281 |

FOREIGN PATENT DOCUMENTS

| | | |
|---|---|---|
| CN | 102099711 A | 6/2011 |
| CN | 102276144 A | 12/2011 |

(Continued)

OTHER PUBLICATIONS

Office Action issued by the State Intellectual Property Office of the Peoples Republic of China dated Apr. 19, 2017 for CN 201510206222.3.

(Continued)

*Primary Examiner* — Ellen Kim
(74) *Attorney, Agent, or Firm* — Tim Tingkang Xia, Esq.; Locke Lord LLP

(57) ABSTRACT

A bending-insensitive single-mode fiber with ultralow attenuation includes a core layer and cladding layers. The cladding layers includes an inner cladding layer surrounding the core layer, a trench cladding layer surrounding the inner cladding layer, an auxiliary outer cladding layer surrounding the trench cladding layer, and an outer cladding layer surrounding the auxiliary cladding layer. The core layer has a radius of 3.0 to 3.9 μm and a relative refractive index of −0.04% to 0.12%. The inner cladding layer has a radius of 8 to 14 μm and a relative refractive index −0.35% to −0.10%. The trench cladding layer has a radius of 14 to 20 μm and a relative refractive index of −0.6% to −0.2%. The auxiliary outer cladding layer has a radius of 35 to 50 μm and a (Continued)

relative refractive index of −0.4% to −0.15%. The outer cladding layer is a pure silica glass layer.

16 Claims, 1 Drawing Sheet

(51) Int. Cl.
 *G02B 6/02* (2006.01)
 *G02B 6/028* (2006.01)

(56) References Cited

FOREIGN PATENT DOCUMENTS

| | | |
|---|---|---|
| CN | 102645699 A | 8/2012 |
| CN | 103345017 A | 10/2013 |
| CN | 103454719 A | 12/2013 |
| CN | 103995314 A | 8/2014 |
| CN | 104360434 A | 2/2015 |
| CN | 104459876 A | 3/2015 |
| CN | 104749691 A | 7/2015 |
| CN | 104991306 A | 10/2015 |
| JP | 5279980 B2 | 9/2013 |
| WO | 2012058051 A1 | 5/2012 |

OTHER PUBLICATIONS

International Search Report (ISR) issued by the State Intellectual Property Office of the Peoples Republic of China dated Feb. 25, 2016 for PCT/CN2015/096115, China.

\* cited by examiner

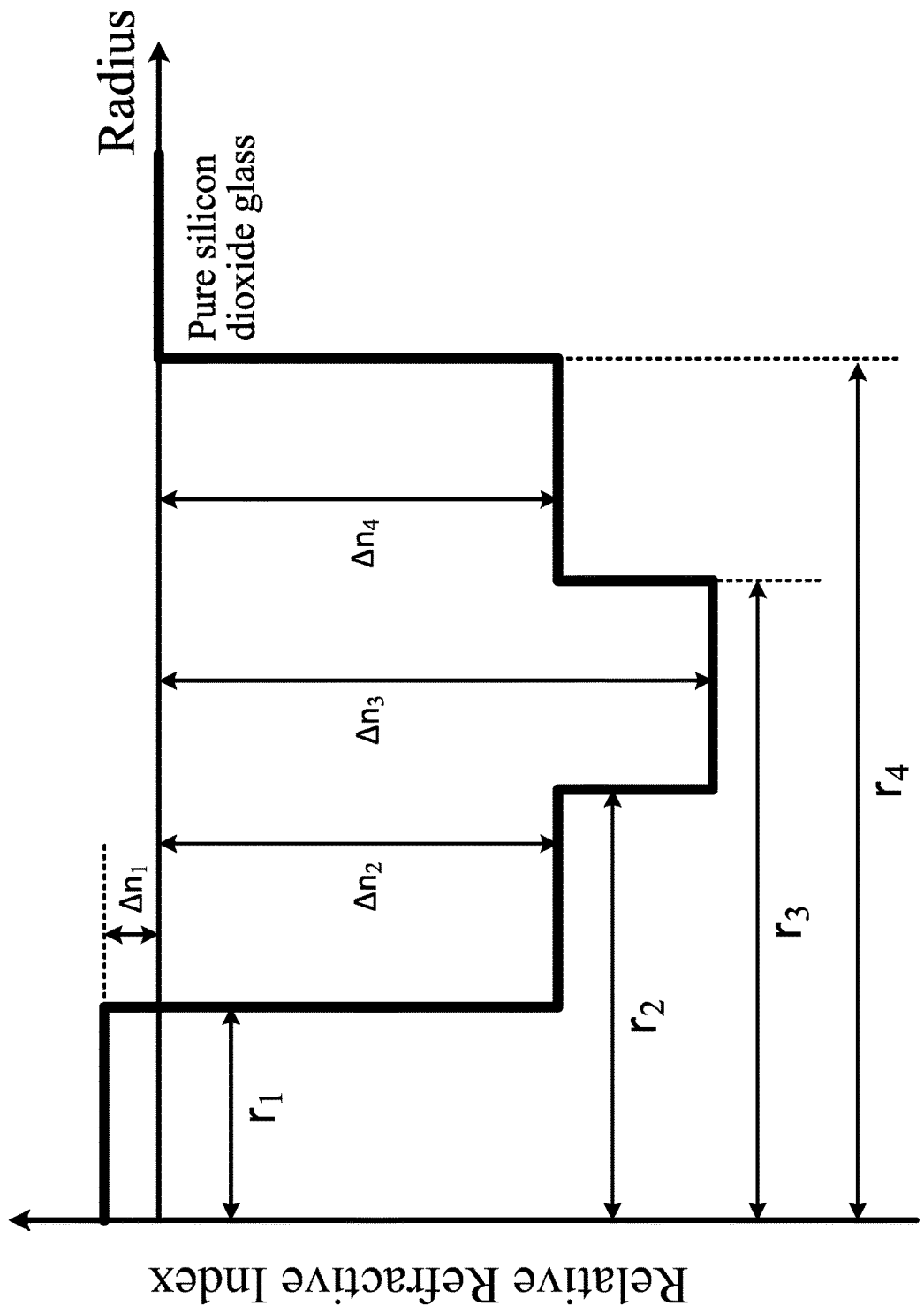

BENDING-INSENSITIVE SINGLE-MODE FIBER WITH ULTRA LOW ATTENUATION

CROSS-REFERENCE TO RELATED APPLICATIONS

This application is a continuation application of International Patent Application No. PCT/CN2015/096115, filed Dec. 1, 2015, which itself claims priority to Chinese Patent Application No. 201510206222.3, filed Apr. 28, 2015 in the State Intellectual Property Office of P.R. China, which are hereby incorporated herein in their entireties by reference.

FIELD OF THE INVENTION

The present invention relates to a bending-insensitive single-mode fiber with ultra low attenuation for use in an optical communication transfer system. The optical fiber has a relatively low attenuation and excellent bending insensitive properties and has a mode field diameter that is compatible with the standard G.657.A2, and therefore it belongs to the technical field of optical communication.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

The optical fiber communication has been widely used in long distance backbone networks to metropolitan area networks and access networks, due to features such as large capacity, long transfer distance, fast transfer speed, and cost saving. The development of the optical fiber communication technology has always been aimed at faster transfer speed, larger capacity, and longer transfer distance, and continuously promotes and improves the performance indexes of an optical fiber and the communication technology of the optical fiber. Especially, in recent years, with the explosive growth in the volume of IP services, the communication network starts to head towards a next generation of sustainable development, and a constructed optical fiber infrastructure having a huge transfer capacity and long distance is the physical basis of the next generation of networks. To satisfy development requirements of the optical fiber communication system, relevant performance indexes of the optical fiber as a transfer medium of an optical fiber communication network also needs to be further improved.

The attenuation coefficient of an optical fiber of one of important performance indexes of the optical fiber, to which the relay distance of the optical fiber communication majorly depends. A small attenuation coefficient of an optical fiber indicates a long distance for which an optical signal carried in the optical fiber can be transferred, and indicates a small attenuation amplitude of a carried optical signal at the same transfer distance. The Optical Signal to Noise Ratio (OSNR) in the optical fiber communication can be effectively increased by reducing the attenuation coefficient, to further improve the transfer quality and the transfer distance of the system. In long-distance transfer distance, an optical signal is transferred by means of relay stations. If the attenuation coefficient of an optical fiber is small, the transfer distance without relay of the optical signal is long, and therefore the distance between relay stations can be increased, thereby greatly reducing the number of relay stations and reducing the operating costs. Therefore, reducing the attenuation coefficient of the optical fiber has a significant meaning in aspects of both system structure optimization and operating costs reduction. In another aspect, with continuously development of FTTX in recent years, it is difficult for the performance of the existing G.652 fiber to meet users' requirements. In an actual application environment, the optical fiber needs to have a particular bending resistance. Therefore, a new generation of bending-insensitive single-mode fiber, G.657 optical fiber, is developed based on the G.652 fiber. The G.657 optical fiber includes a G.657.A optical fiber that is compatible with the G.652 standard and a G.657.B optical fiber that is not compatible with the G.652 standard. The G.657.A type optical fiber has a good compatibility with the G.652.D fiber and has a better bending resistance relative to common G.652.D fibers, and therefore is considered as one of products that are most probably used for replacing the G.652 fiber. Therefore, creation of a new generation of single-mode fiber that is compatible with the G.652 standard, has a low attenuation and a relatively large mode field diameter, and meanwhile also has a bent insensitive property becomes a search focus in the field of communication optical fibers.

Generally, the following several methods may be used to reduce the attenuation of an optical fiber in a manufacturing process of an optical fiber preform. For example, the probability of introduction of external impurities can be reduced by using high-purity raw materials and improving the manufacturing environment and equipment sealing. For example, in Chinese Patent Application No. 201110178833.3, the introduction of external impurities is reduced by using the method of improving the sealing in the process of depositing an optical fiber preform. Alternatively, a process of manufacturing a preform with a larger outer diameter is used, and the over whole attenuation of the optical fiber is reduced by means of the dilution effect of a larger scale perform. In addition, the coating processing used for coating the surface of bare fiber in the process of manufacturing the optical fiber is also a significant factor that influences the attenuation performance of the optical fiber. However, no matter in the aspect of theories or the control of costs and processing in the actual preparation of the optical fiber, reducing doping of the optical fiber and optimizing the cross sections of the optical fiber are the simplest and most effective methods for reducing the attenuation of the optical fiber. Generally, a small concentration of doped material indicates a small loss caused by Rayleigh scattering. In a conventional single-mode fiber, to guarantee total reflection in the optical fiber, a sufficient difference between the refractive indexes of the core layer and the inner cladding layer needs to be ensured, so that the relative refractive index of the core layer is far larger than that of the inner cladding layer of the optical fiber. To ensure such the design, a large amount of doping in a Ge or Ge/F co-doped form needs to be performed in the core layer. However, in the design of cross sections of the conventional optical fiber, laser energy forms a Gaussian distribution in the cross sections of the optical fiber, and approximately 70% laser energy transfers in the core layer with relatively larger doping in the optical fiber. That is, laser transfer of high energy density is centralized in the high-concentration doped core layer having a larger Rayleigh coefficient. By means of proper optical cross section design, a cross section in which energy is not distributed in a Gaussian distribution form is designed, to reduce energy loss in the high-concentration doped core layer, thereby significantly reducing the attenuation performance of the optical fiber.

However, in the conventional cross section design and manufacturing methods for G.657 optical fibers, a relatively large amount of Ge/F co-doping is used in the core layer, and to obtain the optimal macrobending performance, the relative refractive index of the core layer generally is larger than 0.35%. That is, the Ge doping in the core layer is relatively large, thereby causing a relatively large Rayleigh scattering and increasing attenuation of the optical fiber.

Chinese Patent Application No. 201310394404 discloses a design of ultralow attenuation optical fiber, in which the design of an outer cladding layer of pure silica is used. However, a typical step cross section structure is used in the design, instead of using a trench cladding layer design to optimize bending of the optical fiber, and Ge is not used for doping in the core layer thereof, which may therefore cause viscosity mismatch during preparation of the perform. In addition, the attenuation and bending ability thereof are relatively poor.

Therefore, a heretofore unaddressed need exists in the art to address the aforementioned deficiencies and inadequacies.

SUMMARY OF THE INVENTION

One of the objectives of the present invention is to provide a bending-insensitive single-mode fiber with ultralow attenuation having relatively low optical fiber manufacturing costs, relatively low attenuation coefficient, and excellent bending performance.

In one aspect of the invention, the bending-insensitive single-mode fiber with ultralow attenuation includes a core layer and cladding layers surrounding the core layer.

In certain embodiments, the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer.

In certain embodiments, the core layer has a radius $r_1$ in a range of about 3.0 to 3.9 μm, and a relative refractive index difference $\Delta n_1$ in a range of about −0.04% to 0.12%.

In certain embodiments, the core layer is a germanium-fluorine co-doped silica glass layer, wherein a doping contribution of germanium is in a range of about 0.02% to 0.10%.

In certain embodiments, the inner cladding layer has a radius $r_2$ in a range of about 8 to 14 μm, and a relative refractive index difference $\Delta n_2$ in a range of about −0.35% to −0.10%. The trench cladding layer has a radius $r_3$ in a range of about 14 to 20 μm, and a relative refractive index difference $\Delta n_3$ in a range of about −0.6% to −0.2%. The auxiliary outer cladding layer has a radius $r_4$ in a range of about 35 to 50 μm, and a relative refractive index difference $\Delta n_4$ in a range of about −0.4% to −0.15%. The outer cladding layer is a pure silica glass layer, and has a diameter of about 125 μm.

In certain embodiments, the core layer is a germanium and fluorine co-doped silicon-dioxide glass layer, or a germanium-doped silicon-dioxide glass layer, where a doping contribution of germanium is in a range of about 0.02% to 0.10%, preferably, in a range is about 0.04% to 0.08%.

In certain embodiments, the bending-insensitive single-mode fiber has a mode field diameter (MFD) at a wavelength of about 1310 nm being in a range of about 8.4 to 9.1 μm, preferably, being in a range of about 8.5 to 8.8 μm.

In certain embodiments, the bending-insensitive single-mode fiber has a cable cut-off wavelength being less than or equal to about 1260 nm.

In certain embodiments, the bending-insensitive single-mode fiber has a zero dispersion point in a wavelength range of about 1300 to 1324 nm, and a zero dispersion slope being less than or equal to about 0.092 ps/(nm$^2$*km).

In certain embodiments, the bending-insensitive single-mode fiber has a dispersion at a wavelength of about 1310 nm being less than or equal to about 18 ps/(nm*km); and a dispersion at a wavelength of about 1625 nm being less than or equal to about 22 ps/(nm*km).

In certain embodiments, the bending-insensitive single-mode fiber has an attenuation at a wavelength of about 1310 nm being less than or equal to about 0.324 dB/km, preferably, being less than or equal to about 0.304 dB/km.

In certain embodiments, the bending-insensitive single-mode fiber has an attenuation at a wavelength of about 1550 nm being less than or equal to about 0.184 dB/km, preferably, being less than or equal to about 0.174 dB/km.

In certain embodiments, at a wavelength of about 1550 nm, a macrobending loss of the optical fiber that is wound in 10 rounds with a bending radius R of about 15 mm is less than or equal to about 0.03 dB, and the macrobending loss of the optical fiber that is wound in one round with the bending radius R of about 10 mm is less than or equal to about 0.1 dB.

In certain embodiments, the bending-insensitive single-mode fiber has an coating thickness with a typical value being about 250 or 200 μm.

Among other things, the present invention has the following beneficial effects:

The cross section structure of the core and cladding layers of the optical fiber and the internal viscosity match are properly designed so that defects in the optical fiber preparation process and the attenuation of the optical fiber are reduced.

By properly designing the fluorine-doped trench structure of the optical fiber and the cross section structure of the core and cladding layers of the optical fiber, the optical fiber has an MFD equal to or larger than about 8.4 μm.

Comprehensive performance parameters, such as the cut-off wavelength, bending loss, and dispersion, are good in applicable bands, to form a cable cut-off wavelength small enough, to ensure single-mode state of an optical signal that is transferred at the C band in such the type of optical fibers. The multi-step trench cladding layer structure is used in the cross section structure of the optical fiber. The optical fiber has a relatively broad trench cladding layer structure for limiting fundamental mode leakage, thereby improving the bending performance of the optical fiber. The optical fiber is compatible with standard G.657.A2.

The design of pure silica is used for the outer cladding layer structure at the outermost layer, thereby reducing the proportion of the fluorine-doped glass in the optical fiber, and reducing the costs for manufacturing the optical fiber.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a diagram of a refractive-index profile structure distribution according to an embodiment of the present invention.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

From a central axis of an optical fiber, according to changing of a refractive index, a layer closest to the axis is defined as a core layer, i.e., the core layer refers to a central area of a cross section of the fiber, and an outmost layer of the fiber, i.e., a pure-silicon-dioxide layer, is defined as an outer cladding layer of the fiber.

As used herein, a relative refractive index difference $\Delta n_i$ of a layer of a fiber is defined according to the following formula:

$$\Delta n_i = \frac{n_i - n_c}{n_c} \times 100\%$$

where $n_i$ is a refractive index of the corresponding layer, and $n_c$ is a refractive index of the outer cladding layer, that is, a refractive index of the pure silicon dioxide.

A contribution of doped Ge in the core layer of the optical fiber to the refractive index $\Delta Ge$ is defined according to the following equation:

$$\Delta Ge = \frac{n_{Ge} - n_c}{n_c} \times 100\%,$$

where $n_{Ge}$ is a change of the refractive index of the silicon dioxide glass caused by the doped substance Ge doped in the core layer, provided that the doped substance Ge doped in the core layer is doped in the pure silicon dioxide that includes no other doped substance.

Cable cut-off wavelength $\lambda_{cc}$: As defined in the IEC (International Electrotechnical Commission) standard 60793-1-44, a cable cutoff wavelength $\lambda_{cc}$ is a wavelength for which an optical signal no longer transmits as a single-mode signal after transmitting about 22 meters in an optical fiber. During a test, the optical fiber needs to be bent/wound into a circle (one round/turn) with a radius of about 14 cm and two circles (two rounds/turns) with a radius of 4 cm to obtain data.

The description will be made as to the embodiments of the present invention in conjunction with the accompanying drawings. In accordance with the purposes of this invention, as embodied and broadly described herein, this invention, in one aspect, relates to a bending-insensitive single-mode fiber with ultralow attenuation.

According to one embodiment of the invention as shown in FIG. 1, the optical fiber includes a core layer and cladding layers surrounding the core layer.

In one aspect of the invention, the bending-insensitive single-mode fiber with ultralow attenuation includes a core layer and cladding layers surrounding the core layer.

In certain embodiments, the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer.

In certain embodiments, the core layer has a radius $r_1$ in a range of about 3.0 to 3.9 μm, and a relative refractive index difference $\Delta n_1$ in a range of about −0.04% to 0.12%.

In certain embodiments, the core layer is a germanium-fluorine co-doped silica glass layer, wherein a doping contribution of germanium is in a range of about 0.02% to 0.10%.

In certain embodiments, the inner cladding layer has a radius $r_2$ in a range of about 8 to 14 μm, and a relative refractive index difference $\Delta n_2$ in a range of about −0.35% to −0.10%. The trench cladding layer has a radius $r_3$ in a range of about 14 to 20 μm, and a relative refractive index difference $\Delta n_3$ in a range of about −0.6% to −0.2%. The auxiliary outer cladding layer has a radius $r_4$ in a range of about 35 to 50 μm, and a relative refractive index difference $\Delta n_4$ in a range of about −0.4% to −0.15%. The outer cladding layer is a pure silica glass layer, and has a diameter of about 125 μm.

In certain embodiments, the core layer is a germanium and fluorine co-doped silicon-dioxide glass layer, or a germanium-doped silicon-dioxide glass layer, where a doping contribution of germanium is in a range of about 0.02% to 0.10%, preferably in a range is about 0.04% to 0.08%.

In certain embodiments, the bending-insensitive single-mode fiber has a mode field diameter at a wavelength of about 1310 nm being in a range of about 8.4 to 9.1 μm.

In certain embodiments, the bending-insensitive single-mode fiber has a cable cut-off wavelength being less than or equal to about 1260 nm.

In certain embodiments, the bending-insensitive single-mode fiber has a zero dispersion point in a wavelength range of about 1300 to 1324 nm, and a zero dispersion slope being less than or equal to about 0.092 ps/(nm²*km).

In certain embodiments, the bending-insensitive single-mode fiber has a dispersion at a wavelength of about 1310 nm being less than or equal to about 18 ps/(nm*km); and a dispersion at a wavelength of about 1625 nm being less than or equal to about 22 ps/(nm*km).

In certain embodiments, the bending-insensitive single-mode fiber has an attenuation at a wavelength of about 1310 nm being less than or equal to about 0.324 dB/km.

In certain embodiments, the bending-insensitive single-mode fiber has an attenuation at a wavelength of about 1550 nm being less than or equal to about 0.184 dB/km.

In certain embodiments, at a wavelength of about 1550 nm, a macrobending loss of the optical fiber that is wound in 10 rounds with a bending radius R of about 15 mm is less than or equal to about 0.03 dB, and the macrobending loss of the optical fiber that is wound in one round with the bending radius R of about 10 mm is less than or equal to about 0.1 dB.

Table 1 lists optical fiber profile parameters of the bending-insensitive single-mode fibers according to embodiments of the present invention, where ΔGe is a contribution of the doped Ge in the core layer to a refractive index. Table 2 shown corresponding optical parameter properties of the optical fibers listed in Table 1.

TABLE 1

Optical fiber profile parameters of the optical fibers according to embodiments of the present invention

| No. | $r_1$[μm] | $\Delta n_1$[%] | ΔGe[%] | $r_2$[μm] | $\Delta n_2$[%] | $r_3$[μm] | $\Delta n_3$[%] | $r_4$[μm] | $\Delta n_4$[%] |
|---|---|---|---|---|---|---|---|---|---|
| 1 | 3.4 | 0.04 | 0.08 | 10 | −0.25 | 13.5 | −0.52 | 42 | −0.2 |
| 2 | 3.5 | 0.02 | 0.02 | 11.5 | −0.33 | 15.5 | −0.4 | 48 | −0.38 |
| 3 | 3.7 | 0.01 | 0.05 | 12.5 | −0.25 | 15.5 | −0.45 | 45 | −0.4 |
| 4 | 3 | 0.03 | 0.05 | 11 | −0.24 | 14.5 | −0.38 | 38 | −0.36 |
| 5 | 3.2 | 0.1 | 0.1 | 9 | −0.15 | 14 | −0.38 | 41 | −0.18 |
| 6 | 3.8 | 0.05 | 0.08 | 13 | −0.18 | 17 | −0.55 | 40 | −0.22 |
| 7 | 3.3 | 0 | 0.08 | 10 | −0.28 | 12.8 | −0.51 | 46 | −0.25 |
| 8 | 3.6 | 0.06 | 0.02 | 13 | −0.21 | 18 | −0.45 | 47 | −0.27 |
| 9 | 3.1 | −0.04 | 0.03 | 8.5 | −0.32 | 13.7 | −0.58 | 44 | −0.38 |
| 10 | 3.5 | −0.02 | 0.04 | 12 | −0.21 | 19 | −0.5 | 42 | −0.3 |

TABLE 2

Optical fiber performance parameters of the optical fibers according to embodiments of the present invention

| No. | Mode field diameter @1310 [μm] | Cable cut-off wavelength [nm] | Zero dispersion [nm] | Attenuation @1310 nm [dB/km] | Attenuation @1550 nm [dB/km] | R15 mm-10turn Macrobending @1550 nm | R10 mm-1turn Macrobending @1550 nm |
|---|---|---|---|---|---|---|---|
| 1 | 8.5 | 1243 | 1317 | 0.292 | 0.169 | 0.18 | 0.54 |
| 2 | 8.4 | 1209 | 1323 | 0.288 | 0.163 | 0.08 | 0.25 |
| 3 | 8.7 | 1232 | 1318 | 0.294 | 0.167 | 0.2 | 0.62 |

TABLE 2-continued

Optical fiber performance parameters of the optical fibers
according to embodiments of the present invention

| No. | Mode field diameter @1310 [μm] | Cable cut-off wavelength [nm] | Zero dispersion [nm] | Attenuation @1310 nm [dB/km] | Attenuation @1550 nm [dB/km] | R15 mm-10turn Macrobending @1550 nm | R10 mm-1turn Macrobending @1550 nm |
|---|---|---|---|---|---|---|---|
| 4 | 8.5 | 1241 | 1321 | 0.3 | 0.173 | 0.14 | 0.41 |
| 5 | 8.6 | 1241 | 1308 | 0.323 | 0.181 | 0.15 | 0.45 |
| 6 | 8.8 | 1256 | 1312 | 0.321 | 0.178 | 0.14 | 0.43 |
| 7 | 8.5 | 1222 | 1316 | 0.313 | 0.181 | 0.21 | 0.63 |
| 8 | 8.7 | 1247 | 1320 | 0.296 | 0.169 | 0.09 | 0.29 |
| 9 | 8.4 | 1250 | 1311 | 0.301 | 0.171 | 0.23 | 0.72 |
| 10 | 9 | 1258 | 1304 | 0.313 | 0.177 | 0.19 | 0.57 |

According to the present invention, the bending-insensitive single-mode fiber has a relatively low attenuation coefficient and excellent bending performance. By properly designing the cross sections of various core and cladding layers of the optical fiber, the MFD of the optical fiber is equal to or larger than about 8.4 μm. Comprehensive performance parameters such as a cutoff wavelength, a bending loss, and a dispersion of the optical fiber in the present invention are great in wavebands of applications, and are compatible with standard G.657.A2.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A bending-insensitive single-mode fiber with ultralow attenuation, comprising:
a core layer and cladding layers, wherein the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer;
wherein the core layer has a radius $r_1$ in a range of about 3.0 to 3.9 μm, and a relative refractive index difference $\Delta n_1$ in a range of about −0.04% to 0.12%;
wherein the inner cladding layer has a radius $r_2$ in a range of about 8 to 14 μm, and a relative refractive index difference $\Delta n_2$ in a range of about −0.35% to −0.10%;
wherein the trench cladding layer has a radius $r_3$ in a range of about 14 to 20 μm, and a relative refractive index difference $\Delta n_3$ in a range of about −0.6% to −0.2%;
wherein the auxiliary outer cladding layer has a radius $r_4$ in a range of about 35 to 50 μm, and a relative refractive index difference $\Delta n_4$ in a range of about −0.4% to −0.15%; and
wherein the outer cladding layer is a pure silica glass layer, and has a diameter of about 125 μm.

2. The bending-insensitive single-mode fiber according to claim 1, having a mode field diameter at a wavelength of about 1310 nm being in a range of about 8.4 to 9.1 μm.

3. The bending-insensitive single-mode fiber according to claim 1, having a cable cut-off wavelength being less than or equal to about 1260 nm.

4. The bending-insensitive single-mode fiber according to claim 1, having a zero dispersion point in a wavelength range of about 1300 to 1324 nm, and a zero dispersion slope being less than or equal to about 0.092 ps/(nm$^2$*km).

5. The bending-insensitive single-mode fiber according to claim 1, having a dispersion at a wavelength of about 1310 nm being less than or equal to about 18 ps/nm*km; and a dispersion at a wavelength of about 1625 nm being less than or equal to about 22 ps/nm*km.

6. The bending-insensitive single-mode fiber according to claim 1, having an attenuation at a wavelength of about 1310 nm being less than or equal to about 0.324 dB/km.

7. The bending-insensitive single-mode fiber according to claim 1, having an attenuation at a wavelength of about 1550 nm being less than or equal to about 0.184 dB/km.

8. The bending-insensitive single-mode fiber according to claim 1, wherein at a wavelength of about 1550 nm, a macrobending loss of the optical fiber that is wound in 10 rounds with a bending radius R of about 15 mm is less than or equal to about 0.03 dB, and the macrobending loss of the optical fiber that is wound in one round with the bending radius R of about 10 mm is less than or equal to about 0.1 dB.

9. The bending-insensitive single-mode fiber according to claim 1, wherein the core layer is a germanium-fluorine co-doped silica glass layer, wherein a doping contribution of germanium is in a range of about 0.02% to 0.10%.

10. The bending-insensitive single-mode fiber according to claim 9, having a mode field diameter at a wavelength of about 1310 nm being in a range of about 8.4 to 9.1 μm.

11. The bending-insensitive single-mode fiber according to claim 9, having a cable cut-off wavelength being less than or equal to about 1260 nm.

12. The bending-insensitive single-mode fiber according to claim 9, having a zero dispersion point in a wavelength range of about 1300 to 1324 nm, and a zero dispersion slope being less than or equal to about 0.092 ps/(nm$^2$*km).

13. The bending-insensitive single-mode fiber according to claim 9, having a dispersion at a wavelength of about 1310 nm being less than or equal to about 18 ps/(nm*km); and a dispersion at a wavelength of about 1625 nm being less than or equal to about 22 ps/(nm*km).

14. The bending-insensitive single-mode fiber according to claim 9, having an attenuation at a wavelength of about 1310 nm being less than or equal to about 0.324 dB/km.

15. The bending-insensitive single-mode fiber according to claim 9, having an attenuation at a wavelength of about 1550 nm being less than or equal to about 0.184 dB/km.

16. The bending-insensitive single-mode fiber according to claim 9, wherein at a wavelength of about 1550 nm, a macrobending loss of the optical fiber that is wound in 10 rounds with a bending radius R of about 15 mm is less than or equal to about 0.03 dB, and the macrobending loss of the optical fiber that is wound in one round with the bending radius R of about 10 mm is less than or equal to about 0.1 dB.

* * * * *